(12) United States Patent
Ebert et al.

(10) Patent No.: US 6,457,679 B1
(45) Date of Patent: Oct. 1, 2002

(54) METHOD FOR MAINTAINING THE POSITION OF GEOSTATIONARY SATELLITES

(75) Inventors: Klaus Ebert, Ottobrunn; Gerd Reger, Unterhaching, both of (DE)

(73) Assignee: Astrium GmbH, Munich (DE)

(*) Notice: Subject to any disclaimer, the term of this patent is extended or adjusted under 35 U.S.C. 154(b) by 0 days.

(21) Appl. No.: 09/882,381

(22) Filed: Jun. 18, 2001

(30) Foreign Application Priority Data

Jun. 16, 2000 (DE) .......................................... 100 29 768

(51) Int. Cl.$^7$ ................................................. B64G 1/22
(52) U.S. Cl. .................................... 244/158 R; 244/164
(58) Field of Search ........................... 244/158 R, 164, 244/167, 168, 169, 171, 172, 173

(56) References Cited

U.S. PATENT DOCUMENTS

| | | | | |
|---|---|---|---|---|
| 5,020,746 A | * | 6/1991 | Anzel | 244/164 |
| 5,443,231 A | * | 8/1995 | Anzel | 244/164 |
| 5,810,295 A | * | 9/1998 | Anzel | 244/158 R |
| 5,826,831 A | * | 10/1998 | Anzel | 244/164 |
| 5,855,341 A | * | 1/1999 | Aoki et al. | 244/158 R |
| 6,015,116 A | * | 1/2000 | Anzel et al. | 244/164 |
| 6,260,806 B1 | * | 7/2001 | Williams et al. | 244/164 |
| 6,314,344 B1 | * | 11/2001 | Sauer et al. | 244/158 R |

OTHER PUBLICATIONS

Kelly et al., "Stationkeeping of Geostationary Satellites with Simultaneous Eccentricity and Longitude Control", Journal of Guidance Control and Dynamics, vol. 17, No.4 (1996), pp. 769–777.

* cited by examiner

Primary Examiner—Michael J. Carone
Assistant Examiner—Gabriel S. Sukman
(74) Attorney, Agent, or Firm—Crowell & Moring LLP

(57) ABSTRACT

In a method for maintaining the orbital position of a geostationary satellite by compensating perturbational effects of interfering influences, a range of the satellite orbit is determined, relative to a space-fixed reference system, in which the perturbational effects on the satellite position by the interfering influences reaches a maximum. Position maintaining actuators of the satellite are activated within the determined range.

9 Claims, 2 Drawing Sheets

METHOD FOR MAINTAINING THE POSITION OF GEOSTATIONARY SATELLITES

BACKGROUND AND SUMMARY OF THE INVENTION

This application claims the priority of German priority document 100 29 768.4, filed Jun. 16, 2000, the disclosure of which is expressly incorporated by reference herein.

The present invention is directed to a method for monitoring and maintaining a geostationary satellite in a correct orbital location.

Geostationary satellites must meet high precision demands with respect to their positioning. A typical value for the tolerance range in the longitude and latitude is ±0.05 degrees. Due in particular to the perturbational effect of external disturbances acting upon the satellite, orbital maneuvers must be carried out in order to maintain the satellite position in the defined tolerance range. A distinction must be made in this regard between maintaining a position predominantly in the north-south direction (as known, for example, in U.S. Pat. Nos. 5,020,746 and 5,826,831), and predominant east-west positioning (as known, for example, from T. J. Kelly et al., "Stationkeeping of Geostationary Satellites with Simultaneous Eccentricity and Longitude Control", *Journal of Guidance Control and Dynamics*, Vol. 17,. No. 4, July–August 1994, and from E. M. Soop, "Handbook of Geostationary Orbits", Chapter 7.1–7.4, Space Technology Library, 1994). The significant disturbances for the position of the satellite are:

Radiation Pressure of the Sun

The radiation pressure of the sun influences the eccentricity (also known as vector eccentricity) of the satellite orbit which causes a correction requirement, particularly in the east-west direction. Particularly for satellites with large solar generators, such as communication satellites, solar pressure is the dominant disturbance for the east-west movement.

Higher Terms in the Gravitation Potential of the Earth

The tessieral terms of the earth's gravitation potential cause an acceleration $\ddot{\lambda}$ in the mean geographical longitude of the satellite. Such acceleration depends on the geographical longitude $\lambda$ of the satellite. At four points over the earth, it has a zero point (point of equilibrium) and, at other points, it reaches a maximal value $|\ddot{\lambda}|_{max} = 2 \cdot 10^{-3}$ degrees/day$^2$.

Gravitation Effects of Sun and Moon

These interference effects act predominantly in the north-south direction. For the east-west direction, they cause periodic interference effects in the mean longitude and in the vector eccentricity.

It is an object of the present invention, to provide an effective method for maintaining the position of geostationary satellites which requires only minimal control expenditures and therefore minimal fuel expenditures.

This and other objects and advantages are achieved by the method according to the invention, for maintaining the position of geostationary satellites and for compensating the influence of interferences on the position of the satellite, in which a determination is made of the range of the satellite orbit (relative to a space-fixed reference system) the perturbational effect of external interferences on the satellite position reaches a maximum. Actuators are activated in this range of maximal influence to maintain the satellite position. Therefore, according to the invention, it is not simply determined reactively whether the present position of the satellite exceeds a certain tolerance range so that subsequent control can be implemented to correct its position; rather, the orbit range is actively determined in which the maximal influence takes place, and this influence is counteracted already at the point and time of its occurrence.

That is, according to the invention, correction maneuvers are carried out not only when the satellite position exceeds a certain tolerance range. Instead interfering influences are corrected in the ranges on the satellite orbit which are optimal for the existing actuator configuration, even if no departure from the tolerance range has occurred. The method thus permits a reduction of the tolerance range while the fuel requirement remains the same and the tolerance range is kept constant.

The method according to the invention is particularly useful for the compensation of interfering influences in the east-west direction. For this purpose, actuators are used which act predominantly tangentially with respect to the satellite orbit.

The method according to the invention can also be used, however, for north-south position controls as well as for east-west position controls.

Although any one or more of the above-mentioned interferences can be considered to be disturbances for present purposes, it is sufficient to focus consideration on the dominant disturbance for the respectively existing application case. Thus, for example, for corrections predominantly in the east-west direction, the radiation pressure of the sun can be considered the dominant disturbance, but it can also become relevant to other cases.

If the radiation pressure of the sun is considered a disturbance, the actuators preferably are activated in a range of the satellite orbit whose right ascension ($\alpha_m$) encloses an angle of between 45° and 135°, particularly 90°, with the right ascension of the sun ($\alpha_s$) in a geocentrically equatorial reference system. These are the ranges of the satellite orbit in which the interfering influence of the solar pressure becomes maximal. Thus, specifically in these ranges of the satellite orbit, it is advantageous to activate the actuators as a countercontrol in order to largely counteract a positional deviation of the satellite.

Other objects, advantages and novel features of the present invention will become apparent from the following detailed description of the invention when considered in conjunction with the accompanying drawings.

DETAILED DESCRIPTION OF THE DRAWINGS

Figure 2:
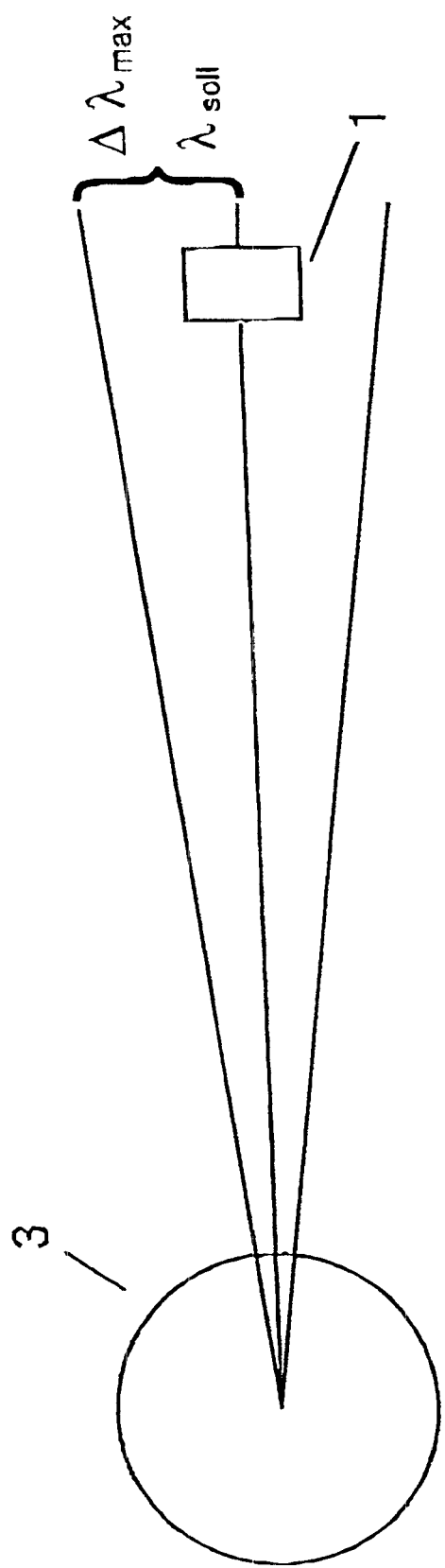
FIG. 2 is a view of the satellite position in a geocentrically equatorial reference system.

Herein, the case of the east-west position control for geostationary satellites is considered. A geostationary satellite 1, as illustrated in FIG. 2, is held in a tolerance range $\pm \Delta \lambda_{max}$ (typical value: 0.05 degrees) about the desired value of the geographical longitude $\lambda_{des}$, by means of orbit control actuators. Therefore, a control of the mean longitude $\bar{\lambda}$, of the mean drift D in the longitude and of the mean vector eccentricity $\bar{e}$ is required. The components of the vector eccentricity $\bar{e}$ are defined as follows:

$$e_x = e \cos(\Omega + \omega) \tag{1}$$

$$e_y = e \sin(\Omega + \omega)$$

Ω: right ascension of the ascending node
ω: argument of the perigee
e: eccentricity of the orbit.

These parameters describe the extent of the ellipticity of the satellite orbit in a space-fixed reference system.

At regular intervals Δt (typically, 14 days, for example, east-west position correcting maneuvers are carried out. In this case, each east-west maneuver can consist of several partial maneuvers, the number of which depends on the targeted change in the values $\bar{\lambda}$, D, $\bar{e}$.

| Number of Partial Maneuvers | Targeted Change of |
|---|---|
| 1 | 1 Size of Orbit (for example, D) |
| 2 | 2 Sizes of Orbit (for example, D, $\bar{e}$) |
| 3 | 3 Sizes of Orbit ($\bar{\lambda}$, D, $\bar{e}$) |

East-west maneuvers preferably consist of two (D, $\bar{e}$) or of three partial maneuvers (control of $\bar{\lambda}$, D, $\bar{e}$)

The geographical longitude λ depends on the drift D and the vector eccentricity $\bar{e}$ in the following manner:

$$\lambda = \bar{\lambda}_o + D_0(t-t_0) + 2(e_x \sin\alpha - e_y \cos\alpha) + \frac{\ddot{\lambda}}{2}(t-t_0)^2 \quad (2)$$

λ: geographic longitude
$\bar{\lambda}_o$: mean geographic longitude at the time t=$t_o$
$D_0$: mean drift in the geographic longitude at the time t=$t_0$
α: right ascension of the satellites with respect to the vernal point
$\ddot{\lambda}$: acceleration in the east-west direction by longitude-dependent terms in the earth potential For geostationary satellites with high values for the surface/mass ratio, the dominant disturbance is the radiation pressure of the sun, which leads to an almost circular course in $\bar{e}$ over a year's time, and to a change of the numerical eccentricity e. Typical values for the eccentricity result in the satellite's exceeding the tolerance range $\Delta\lambda_{max}$ in the longitude λ. Thus, the numerical eccentricity e had to be reduced again by activating the actuators, this being achieved by a change Δv of the orbit velocity in a space-fixed reference system. In order to minimize the Δv requirement for east-west maneuvers, the mean eccentricity vector is not controlled to zero but, as a result of orbit maneuvers, is held on a control loop with the radius $e_c$, the perigee being aligned with the sun (sun-pointed perigee control).

The size of $e_c$ is provided by $$e_c = [2(\Delta\lambda_{max} - \Delta\lambda_{marg}) - \Delta\lambda(\ddot{\lambda})]/4$$

in which $\Delta\lambda_{max}$ is reduced by the range $\Delta\lambda_{marg}$ in order to take into account errors in the orbit determination. Δλ, on the other hand, is provided by $$\Delta\lambda(\ddot{\lambda}) = \frac{|\ddot{\lambda}|}{2}\left(\frac{\Delta t}{2}\right)^2$$

and takes into account the drift in the geographic longitude of the satellite caused by $\ddot{\lambda}$ over the time Δt. For the maximal value in $|\ddot{\lambda}|$ and Δt=14 days, the longitudinal drift reaches the value $$\Delta\lambda = 4.90 \cdot 10^{-2} \text{ degrees}$$

The quantity $e_c$ is therefore a function of λ and clearly has to be reduced for satellite positions with λ≠0. This reduction leads to an increased demand on the change of the orbit velocity Δv for east-west maneuvers when the solar pressure is the dominant interference term for the east-west movement.

The maneuvering strategy for east-west maneuvers used up to now has the disadvantage that the Δv requirement is a function of the geographic longitude of the satellite position. Minimal Δv values are achieved for λ=0. In the case of an unchanged tolerance range $\Delta\lambda_{max}$, λ≠0 results in an increased Δv demand. Thus, up to now, the position holding or position correction of the satellite was determined by the most varied factors.

The method according to the invention can be used, for example, for autonomous orbit holding methods, but is also suitable for the implementation in methods for east-west maneuvers.

In the method according to the invention, particularly the drift D is corrected even if the tolerance range in the geographic longitude is not violated. For this purpose, velocity changes $\Delta V_t$ tangentially to the orbit are required. (See FIG. 1.) The effect is that the drift correction does not depend on the right ascension $\alpha_m$ where the maneuver is carried out.

The range of the satellite orbit for the corrections is defined such that the dominant interference effect is optimally reduced to the mean eccentricity vector—specifically the radiation pressure of the sun. The range for the correction maneuver in the orbit is therefore determined by the influence of the maneuver on the mean eccentricity vector $\bar{e}$. The variation $\bar{e}^{(s)}$ in the eccentricity vector caused by the radiation pressure of the sun is defined by $$\Delta e_x^{(s)}/\Delta t = -C\cos^2\delta_s \sin\alpha_s$$

$$\Delta e_y^{(s)}/\Delta t = -C\cos^2\delta_s \cos\alpha_s \quad (3)$$

Figure 1:
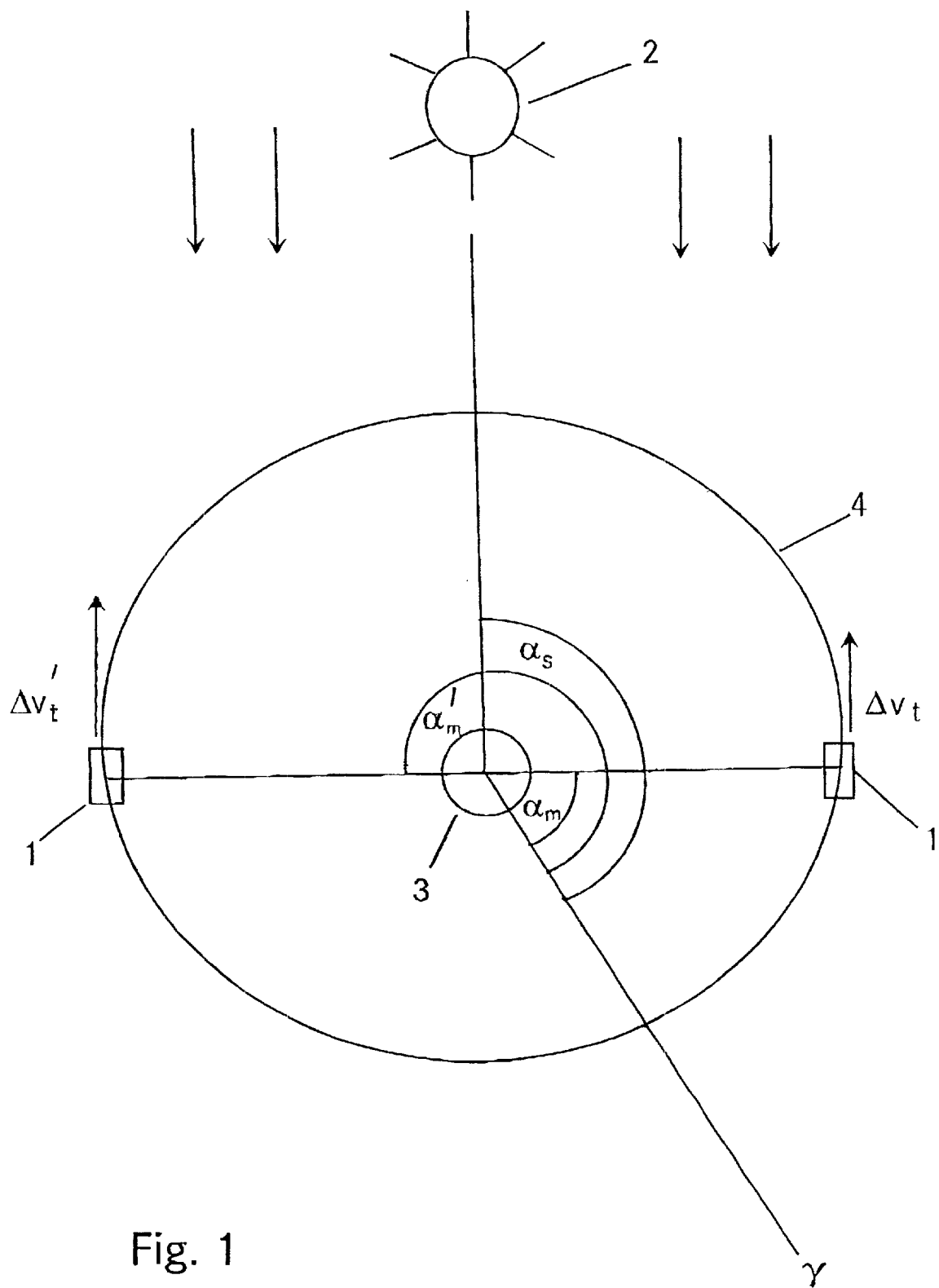
FIG. 1 is a view of the satellite orbit in a space-fixed reference system.

In this case, C is a constant which is a function of the interference acceleration of the satellite caused by the radiation pressure. The quantity $\delta_s$ is the declination and $\alpha_s$ is the right ascension of the sun in the geocentrically equatorial system of coordinates. FIG. 1 illustrates the right ascension $\alpha_s$ which is measured with respect to the vernal point α. For reasons of simplification, the declination is not illustrated. FIG. 1 also shows the influence of the radiation pressure (indicated by vertical arrows) of the sun 2 on a satellite 1 which is geostationarily situated over the earth 3. As illustrated by the above equations (3), the variation $\Delta\bar{e}^{(s)}$ is therefore perpendicular to the actual direction of the sun 2 viewed from the satellite.

The orbit range on which a drift correction takes place is now selected such that, as a result of the maneuver, $\Delta\bar{e}^{(s)}$ is simultaneously corrected as extensively as possible. For this purpose, actuators (for example, propelling nozzles), are activated which counteract the influence of the radiation pressure and finally cause a change Δv of the orbit velocity of the satellite 1. For this purpose, for example, in an onboard-autonomous manner in the satellite 1, the optimal orbit range of the satellite orbit 4 is determined in which a compensation of the interfering influences can take place, and in which the following therefore applies $$\Delta\bar{e}^{(m)} \sim -\Delta\bar{e}^{(s)}$$

wherein $\Delta\bar{e}^{(m)}$ represents the change in $\bar{e}$ caused by the maneuver. In view of equation (3), the orbit range for the maneuver depends only on the right ascension $\alpha_s$ of the sun. Thus, for determining the optimal orbit range, this right ascension $\alpha_s$ of the sun is determined.

$\bar{e}$ is corrected most efficiently by means of tangential velocity changes $\Delta v_t$. For this purpose, the following is obtained $$\left\{ \begin{pmatrix} \Delta e_x \\ \Delta e_y \end{pmatrix} \right\} = \frac{2\Delta_t}{v_s} \begin{pmatrix} \cos\alpha_m \\ \sin\alpha_m \end{pmatrix} \qquad (4)$$

$\alpha_m$: right ascension where maneuver is implemented
$v_s$: velocity of the satellite in the geostationary orbit In this case, $\Delta_m$ is the right ascension of the satellite 1 in the orbit 4 in which the maneuver is implemented. By means of equation (3), the optimal orbit range $$\alpha_m = \alpha_s \pm 90°$$

for the tangential thrust is obtained from Equation (4).

If the power unit configuration of the satellite permits no purely tangential thrust, the optimal orbit range for the maneuver should be correspondingly modified.

Thus, for example, in an onboard-autonomous manner, an orbit range of the satellite orbit is determined whose right ascension $\alpha_m$ is approximately perpendicular to the right ascension $\alpha_s$ of the sun 2. However, the maneuver can also take place in another orbit range around this optimal orbit range, but is at least situated within an orbit range which encloses an angle of from 45° to 135° with the right ascension $\alpha_s$ of the sun 2. The right ascension $\alpha_s$ of the sun can be determined by means of conventional methods.

As a result of the additional orbit corrections, the eccentricity radius $e_c$ can be enlarged, the $\Delta\lambda(\lambda)$ being maintained close to zero. A uniform maneuvering strategy is obtained which does not depend on the geographical longitude of the satellite. While the tolerance range $\Delta\lambda_{max}$ is the same, the $\Delta v$ requirement for the position holding is reduced. On the other hand, while the $\Delta v$ requirement is the same, $\Delta\lambda_{max}$ can be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for maintaining an orbital position of a geostationary satellite by compensating perturbational effects of interfering influences, said method comprising:

determining a range of the satellite orbit, relative to a space-fixed reference system, where the perturbational effects on the satellite position by the interfering influences reaches a maximum; and activating position maintaining actuators of said satellite within the determined range.

2. The method according to claim 1, wherein said actuators are operative predominantly tangentially with respect to the satellite orbit, in said space-fixed reference system.

3. The method according to claim 1, wherein said interfering influences include at least radiation pressure of the sun, and drift in geographic longitude.

4. The method according to claim 2, wherein said interfering influences include at least radiation pressure of the sun, and drift in the geographic longitude.

5. The method according to claim 3, wherein said actuators are activated within a range of the satellite orbit whose right ascension ($\alpha_m$) encloses an angle of between 45° and 135° with the right ascension of the sun ($\alpha_s$) in a geocentrically equatorial reference system.

6. The method according to claim 4, wherein said actuators are activated within a range of the satellite orbit whose right ascension ($\alpha_m$) encloses an angle of between 45° and 135° with the right ascension of the sun ($\alpha_s$) in a geocentrically equatorial reference system.

7. The method according to claim 5, wherein the angle is 90°.

8. The method according to claim 6, wherein the angle is 90°.

9. The method according to claim 1, wherein for enlarging the eccentricity radius ($e_c$) of the satellite orbit, orbit corrections take place such that the drift ($\Delta\lambda$) in the geographic longitude is minimized.

* * * * *